US009459178B2

(12) United States Patent
Meduru et al.

(10) Patent No.: US 9,459,178 B2
(45) Date of Patent: Oct. 4, 2016

(54) METHOD AND TOOL FOR CHECKING ALIGNMENT BETWEEN GEARS

(71) Applicant: Caterpillar Inc., Peoria, IL (US)

(72) Inventors: Bharatkumar Meduru, Dunlap, IL (US); Curtis J. Graham, Peoria, IL (US); Gunasekar Thangarasu, Chennai (IN); Ramshankar Muthukumar, Chennai (IN)

(73) Assignee: Caterpillar Inc., Peoria, IL (US)

( * ) Notice: Subject to any disclaimer, the term of this patent is extended or adjusted under 35 U.S.C. 154(b) by 69 days.

(21) Appl. No.: 14/608,235

(22) Filed: Jan. 29, 2015

(65) Prior Publication Data
US 2015/0143890 A1    May 28, 2015

(51) Int. Cl.
*G01M 13/02*    (2006.01)

(52) U.S. Cl.
CPC .................. *G01M 13/021* (2013.01)

(58) Field of Classification Search
None
See application file for complete search history.

(56) References Cited

U.S. PATENT DOCUMENTS

| 2,616,184 | A | | 11/1952 | Mendro et al. |
| 4,295,276 | A | | 10/1981 | Ellington, III |
| 4,788,856 | A | * | 12/1988 | Felger ................ G01M 13/025 73/115.06 |
| 5,271,271 | A | * | 12/1993 | Frazier ............... G01M 13/021 33/501.13 |
| 5,373,735 | A | * | 12/1994 | Gutman ............. G01M 13/021 33/501.07 |
| 8,474,149 | B2 | | 7/2013 | Zhang |

FOREIGN PATENT DOCUMENTS

CN        102519348        6/2012

* cited by examiner

*Primary Examiner* — Andre Allen

(57) ABSTRACT

The present disclosure relates to a method of checking an alignment between a first gear and a second gear using a tool is provided. The tool includes a base portion defining a longitudinal axis and an elongate portion extending from the base portion along a transverse axis perpendicular to the longitudinal axis. Further, the second gear is received in an inner bore of the first gear. The method includes inserting at least partially the base portion of the tool within an inner bore of the second gear. The method also includes inserting a first pin extending from the elongate portion within a space between adjacent teeth of the first gear. The method further includes determining that the first gear is aligned with the second gear if a second pin extending from the elongate portion is received within a space between adjacent teeth of the second gear.

1 Claim, 6 Drawing Sheets

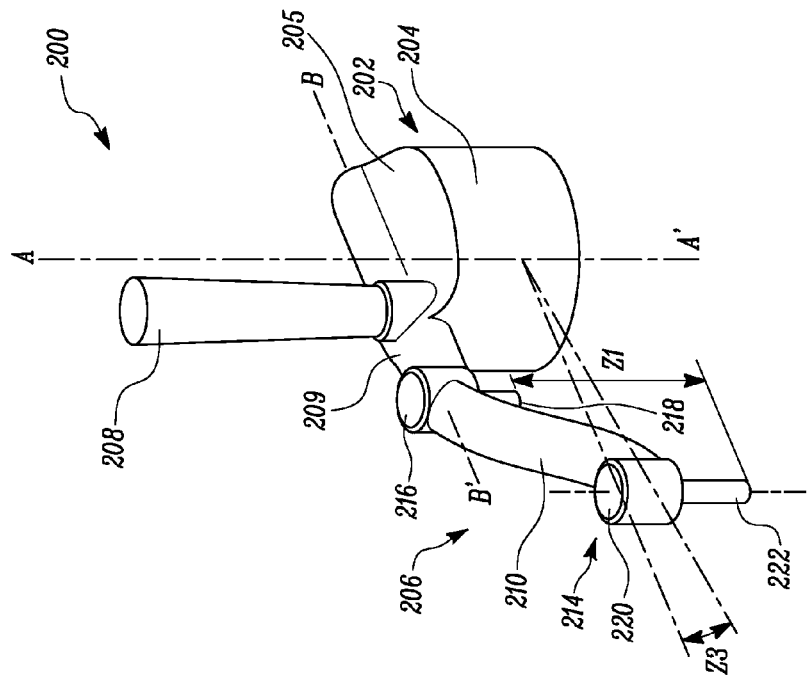
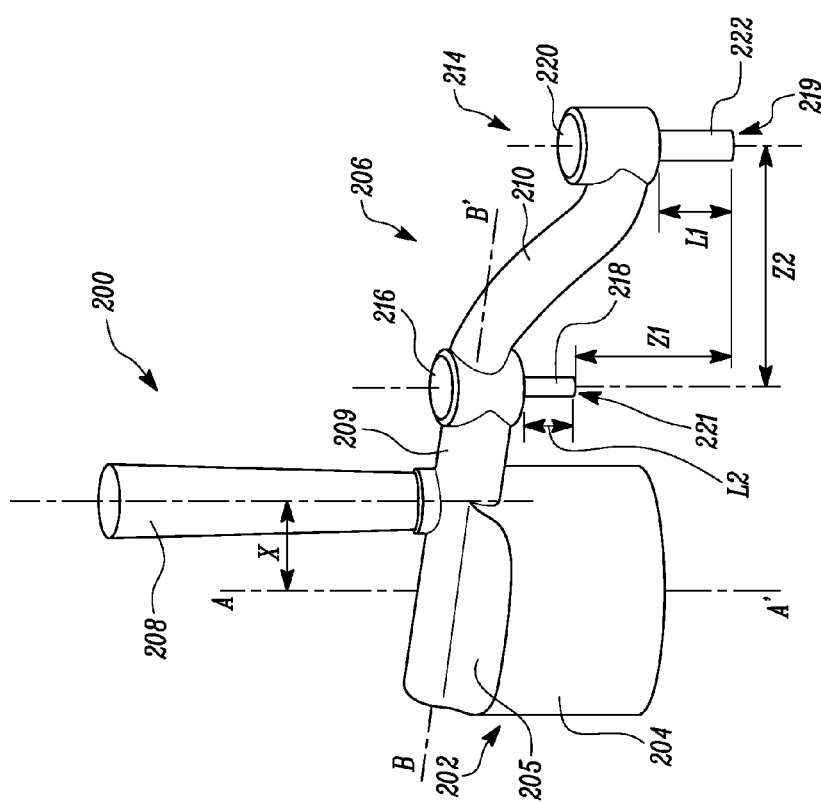

US 9,459,178 B2

METHOD AND TOOL FOR CHECKING ALIGNMENT BETWEEN GEARS

TECHNICAL FIELD

The present disclosure relates to a method and a tool for checking the alignment of between gears of a gear assembly.

BACKGROUND

A gear assembly having two gears is used in various applications, such as engines, transmissions, and the like. The gears typically have different diameters and widths. Further, in some cases, a design angular offset is provided between teeth of the two gears. During manufacturing or usage of the gear assembly, the angular offset between the teeth may lie outside a permissible tolerance value. Such misalignment may affect a performance of the gear assembly and an associated component. Hence, the alignment between the gears may have to be checked before the gear assembly is fitted and utilized in a power transfer system.

For reference, U.S. Pat. No. 8,474,149 (the '149 patent) discloses a test device for testing whether an axis of a first portion of an article is coaxial with an axis of a second portion of the article. The test device includes a supporting member, a benchmark member fixed to a first end of the support member, and a test member slidably received in a second end of the supporting member opposite to the first end. The benchmark member includes a first test portion to position the first portion of the article that are coaxial within a coaxial tolerance. The test member includes a second test member coaxial with the first test portion. If the second portion is capable of being positioned to the second test portion, the article is qualified. If the second portion is incapable positioned to the second test portion, the article is unqualified.

SUMMARY OF THE DISCLOSURE

In an aspect of the present disclosure, a method of checking an alignment between a first gear and a second gear using a tool is provided. The tool includes a base portion defining a longitudinal axis and an elongate portion extending from the base portion along a transverse axis perpendicular to the longitudinal axis. Further, the second gear is received in an inner bore of the first gear. The method includes inserting at least partially the base portion of the tool within an inner bore of the second gear. The method also includes inserting a first pin extending from the elongate portion within a space between adjacent teeth of the first gear. The method further includes determining that the first gear is aligned with the second gear if a second pin extending from the elongate portion is received within a space between adjacent teeth of the second gear.

Other features and aspects of this disclosure will be apparent from the following description and the accompanying drawings.

BRIEF DESCRIPTION OF THE DRAWINGS

FIG. 2A and FIG. 2B illustrate different perspective views of the tool of FIG. 1;

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
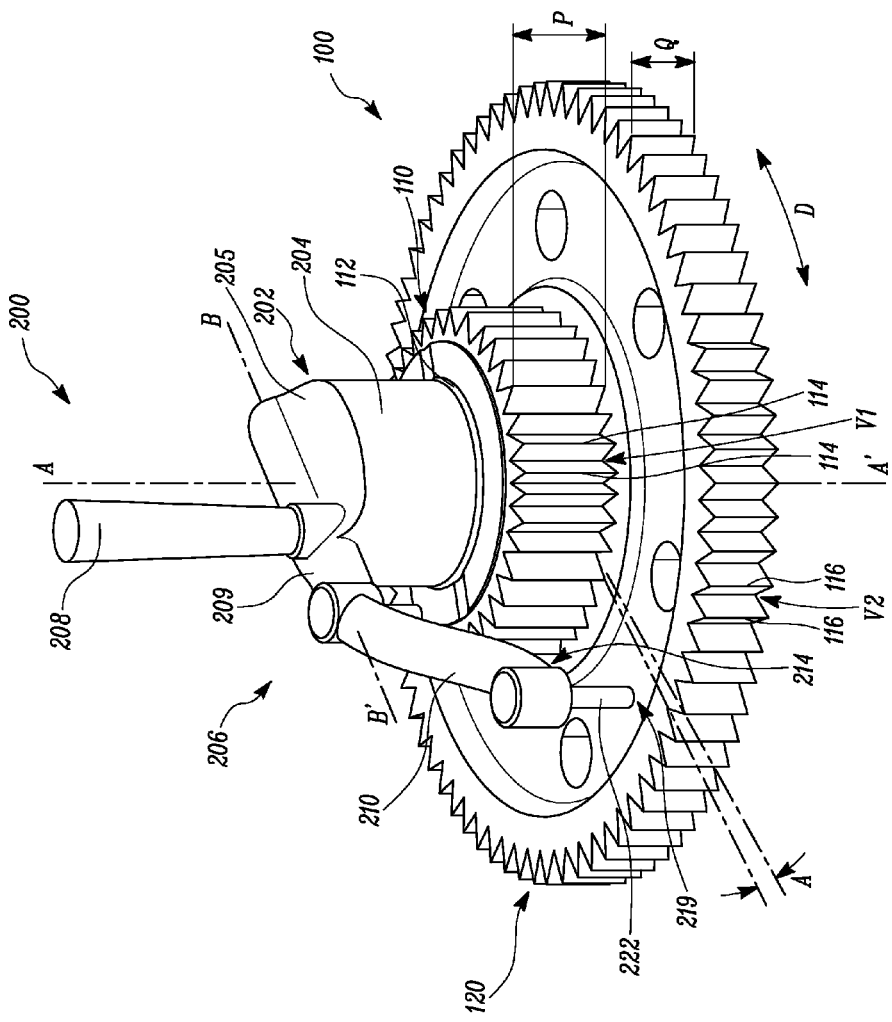
FIG. 1 illustrates a perspective view of a tool for checking an alignment between two gears of a gear assembly, according to an embodiment of the present disclosure.

FIG. 1 shows a perspective view of an exemplary gear assembly 100. The gear assembly 100 may be used in various applications, such as an engine, a transmission, and the like. In the illustrated embodiment, the gear assembly 100 may be used as a timing gear in an engine. Specifically, the gear assembly 100 may be used in conjunction with a cam shaft of the engine.

Referring to FIG. 1 the gear assembly 100 includes a first gear 120 and a second gear 110. The first gear 120 has a larger diameter than the second gear 110. In the illustrated embodiment, the first gear 120 and the second gear 110 are spur gears. However, in alternate embodiments, the gears may be helical, beveled, and the like. The first gear 120 has a face width Q. Further, a space V2 between two adjacent teeth 116 is substantially V-shaped. Similarly, the second gear 110 may have a face width P. Further, a space V1 between two adjacent teeth 114 of the second gear 110 is substantially V-shaped.

The first gear 120 has an inner bore (not shown). Further, a second engaging portion may be provided on the inner bore of the first gear 120. The second gear 110 has an inner bore 112. The second gear 110 may also include a first engaging portion (not shown). The first and second engaging portions may be complementary to one another. In various embodiments, the first and second engaging portions may be a complementary slot and a projection. In an embodiment, the second gear 110 may be press-fitted into the inner bore of the first gear 120 such that the first and second engaging portions may engage with each other. Further, the second gear 110 is co-axially received within the inner bore of the first gear 120. Alternatively, the first and second gears 110, 120 may be coupled to each other using various methods, such as welding, adhesives, and the like. It may also be contemplated that the first and second gears 120, 110 may be integrally formed.

Further, an angular offset A may be provided between each of the teeth 116 of the first gear 120 and each of the teeth 114 of the second gear 110 along a circumferential direction D of the first gear 120 and the second gear 110. Typically, the angular offset A may include a design angular offset A0±a tolerance T. However, during manufacturing or usage of the gear assembly 100, the angular offset A may deviate from the design angular offset A0 by a value beyond the tolerance T. It may also be contemplated that the design angular offset A0 is zero. In such a case, the teeth 116, 114 may be designed to be angularly aligned with each other.

As shown in FIG. 1, a tool 200 is used to check an alignment between the first gear 120 and the second gear 110. Specifically, the tool 200 is used to check whether the deviation of the angular offset A from the design angular offset A0 is within the tolerance T. The tool 200 is at partially received within the inner bore 112 of the second gear 110. The tool 200 is described hereinafter in detail.

FIG. 2A and FIG. 2B illustrate different perspective views of the tool 200, according to the embodiment of the present disclosure. Reference may also be made to FIG. 1 to describe one or more components of the gear assembly 100. The tool 200 includes a base portion 202 defining a longitudinal axis AA'. The longitudinal axis AA' may coincide with a common axis of the first and second gears 120, 110. The base portion 202 includes a cylindrical section 204 received partially within the inner bore 112 of the first gear 120 and a curved section 205 extending from the cylindrical section 204. The cylindrical section 204 has a substantially cylindrical shape with a taper. The taper is provided to account for an allowable tolerance in a diameter of the inner bore 112. The curved section 205 is curved with a width reducing progressively from the cylindrical section 204. The tool 200 also includes a handle 208 extending from the curved section 205 along the longitudinal axis AA'. The handle 208 may be further offset from the longitudinal axis AA' of the base portion 202 by a distance X. The handle 208 may be provided to facilitate handling of the tool 200 by a user. In an embodiment, the handle 208 may be a separate component coupled to the base portion 202. In an alternative embodiment, the handle 208 and the base portion 202 may be integrally formed.

The tool 200 further includes an elongate portion 206 substantially along a transverse axis BB' perpendicular to the longitudinal axis AA'. The elongate portion 206 includes a first section 209 and a second section 210. The first section 209 may be proximate to the base portion 202 and has a substantially cylindrical shape. The second section 210 extends from the first section 209 along the transverse axis BB'. The second section 210 may also be bent along the longitudinal axis AA' and the circumferential direction D.

The elongate portion 206 includes a first support 220 disposed at a free end 214 of the second section 210, and a second support 216 disposed between the first section 209 and the second section 210. A first pin 222 extends from the first support 220 along the longitudinal axis AA' by a length L1. Similarly, a second pin 218 extends from the second support 216 along the longitudinal axis AA' by a length L2. Each of the first pin 222 and the second pin 218 may be substantially cylindrical with a diameter smaller than the respective first and second supports 220, 216. Due to the shape of the second section 210, the second pin 218 is offset with respect to the first pin 222 along at least the longitudinal axis AA' and the transverse axis BB'. Specifically, a first offset Z1 and a second offset Z2 may be present between the first pin 222 and the second pin 218 along the longitudinal axis AA' and the transverse axis BB', respectively.

The first offset Z1 may correspond to a difference in height between free ends 219, 221 of the first and second pins 222, 218, respectively. In the illustrated embodiment, the length L1 of the first pin 222 may be greater than the length L2 of the second pin 218 such that the first offset Z1 may be greater than the face width Q of the first gear 120. The second offset Z2 may be substantially equal to a difference in radii between the first and second gears 120, 110. Further, a third offset Z3 may be provided between the first pin 222 and the second pin 218 along the circumferential direction D. In an embodiment, the third offset Z3 may be substantially equal to the design angular offset A0+the tolerance T.

Figure 3:
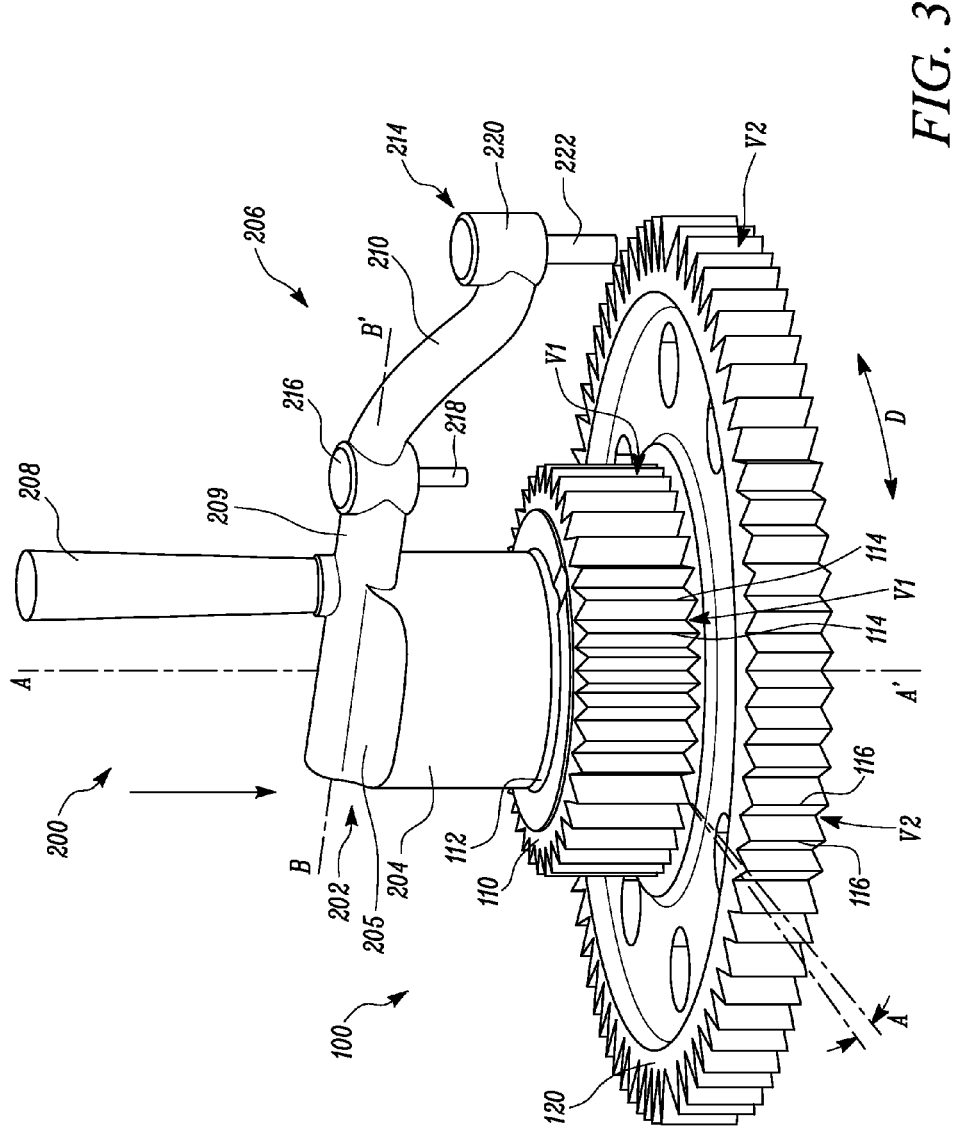
FIGS. 3 to 5 illustrate exemplary views of a method of checking the alignment between the two gears.
Figure 4:
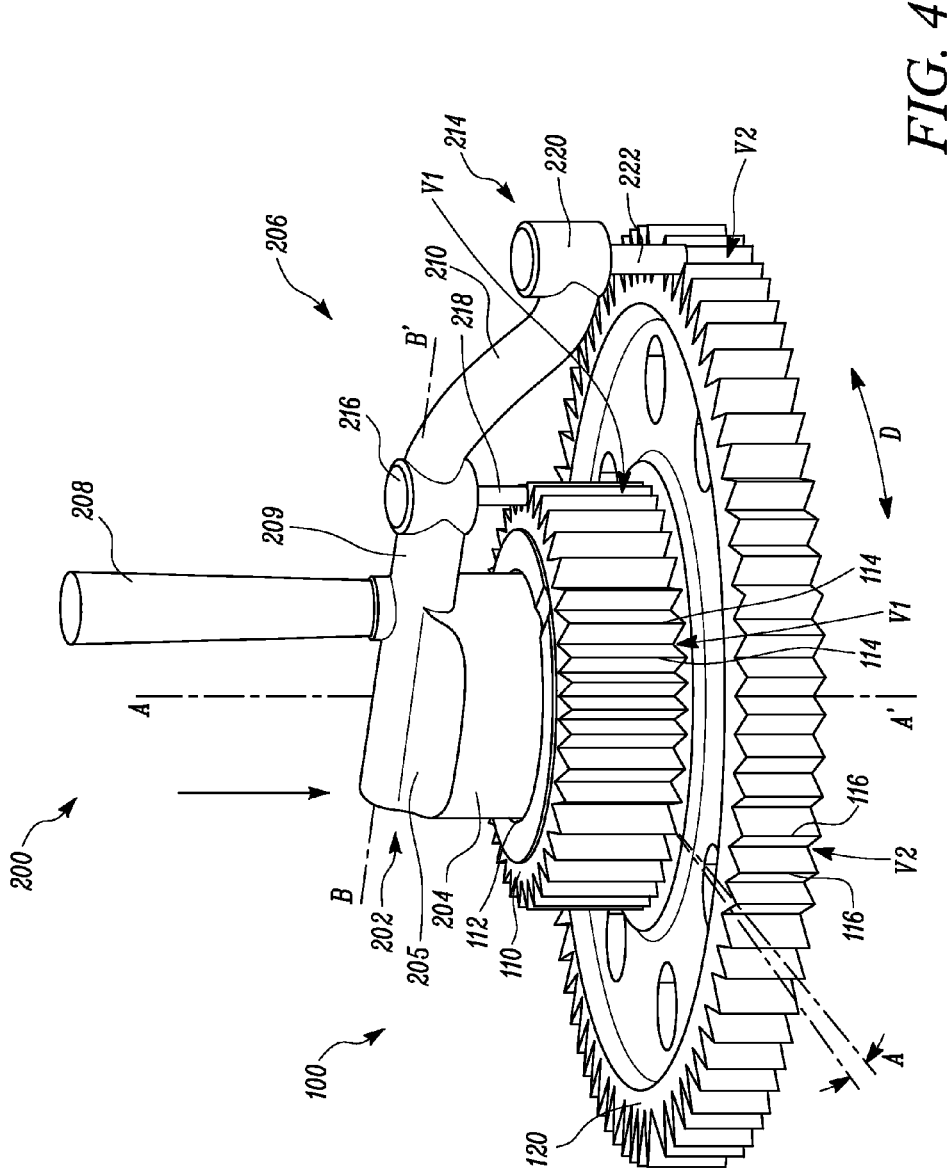
Figure 5:
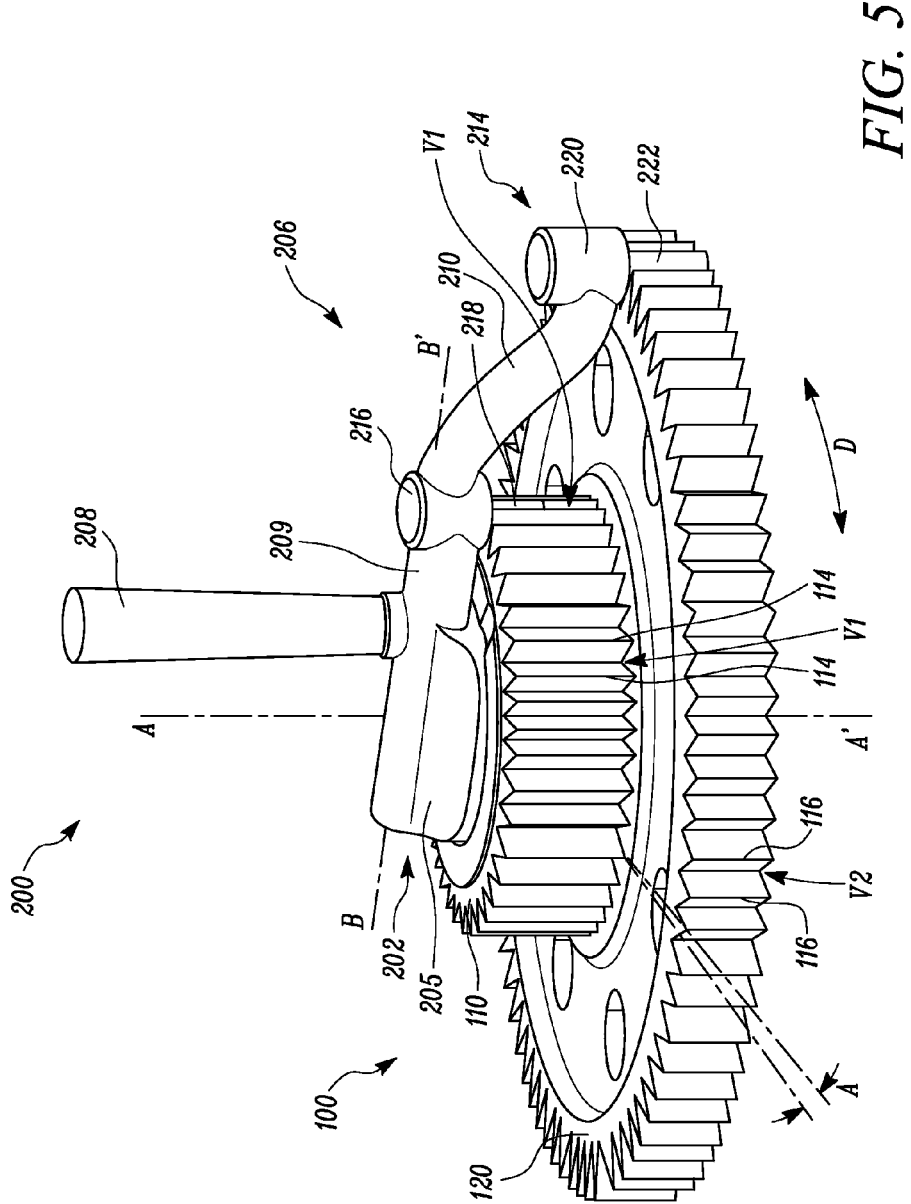
Figure 6:
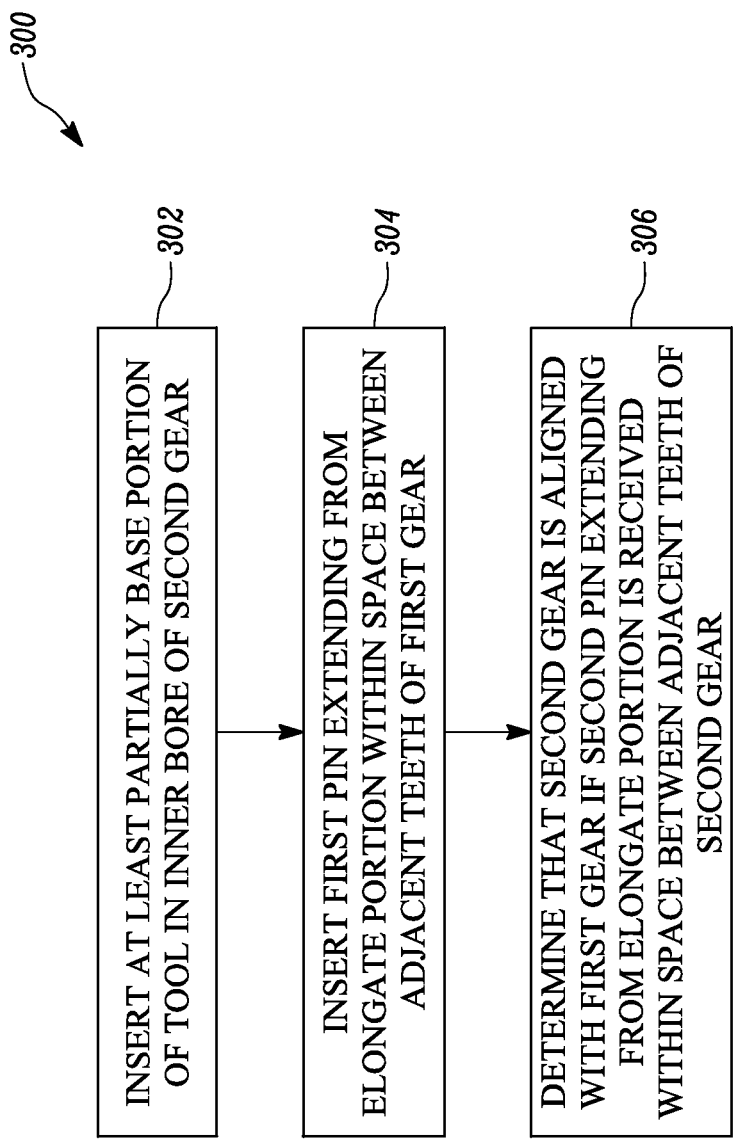
FIG. 6 illustrates a flow chart for the method of checking the alignment of the two gears, according to an embodiment of the present disclosure.

FIGS. 3 to 5 illustrates an exemplary method 300 to check alignment between the teeth 116, 114 of the first and second gears 120, 110, respectively. Further, FIG. 6 shows the flowchart of the method 300, according to an embodiment of the present disclosure. Referring to FIGS. 1 to 6, at step 302, the method 300 includes inserting at least partially the base portion 202 of the tool 200 in the inner bore 112 of the second gear 110. Specifically, the cylindrical section 204 of the base portion 202 is partially inserted into the inner bore 112. The taper of the cylindrical section 204 may facilitate insertion of the cylindrical section 204 into the inner bore 112. In an embodiment, before partially inserting the base portion 202 into the inner bore 112, the tool 200 may be oriented such that the longitudinal axis A-A' of the base portion 204 is substantially aligned with the axis of the second gear 110. Further, the first pin 222 is aligned with the space V2.

At step 304, the method 300 includes inserting the first pin 222 extending from the elongate portion 206 within the space V2 between the adjacent teeth 116 of the first gear 120. The first pin 222 enters the space V2 as the base portion 202 is further moved into the inner bore 112 along the longitudinal axis AA'. The diameter of the first pin 222 may be selected such that the first pin 222 may be fully inserted within the space V2.

At step 306, the method 300 includes determining that the second gear 110 is aligned with the first gear 120 if the second pin 218 extending from the elongate portion 206 is received within the space V1 between the adjacent teeth 114 of the second gear 110. The diameter of the second pin 218 may be selected such that the second pin 218 may be fully inserted within the space V1. The first offset Z1 may be greater than the face width Q of the first gear 120. This may ensure that the first pin 222 may be inserted within the space V2 of the first gear 120 before the second pin 218 is inserted within the space V1 of the second gear 110. Further, the second offset Z2 between the first and second pins 222, 218 may ensure that the first and second pins 222, 218 are substantially aligned with the spaces V2, V1, respectively, along the transverse axis BB'. Moreover, the third offset Z3 may ensure that the second pin 218 is received within the space V1 if a deviation of the angular offset A from the design angular offset A0 lies within the tolerance T. However, if the deviation is greater than the tolerance T, movement of the second pin 218 may be obstructed by one of the teeth 114 of the second gear 110. Hence, the second pin 218 may not be able to enter within the space V1. Therefore, the second gear 110 may be misaligned with the first gear 120.

INDUSTRIAL APPLICABILITY

The present disclosure is related to the tool 200 and the method 300 of checking the alignment between the first and second gears 120, 110 of the gear assembly 100 using the tool 200. As described above, the method 300 may enable quick and convenient checking of the alignment between the first and second gears 120, 110. The tool 200 and the method 300 may not require any special skillset. Hence, different personnel may be able to check alignment of the gear assembly 100 in various environments. For example, the tool 200 and the method 300 may be used to perform a quality check after press-fitting the first and second gears 120, 110. Further, the tool 200 and the method 300 may be used to check the alignment of the gear assembly 100 during a remanufacturing process of the associated component, such as an engine. Additionally, the tool 200 and the method may be used during maintenance by an operator.

The tool 200 and the method 300 may be used for checking the alignment of multiple such gear assemblies 100. It may also be contemplated that shape and dimensions of the tool 200 may be varied as per specifications of a gear assembly having two gears. Such specifications may include the diameters and the face widths of the gears, the design angular offset and the tolerance values.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of checking an alignment between a first gear and a second gear using a tool having a base portion defining a longitudinal axis and an elongate portion extending from the base portion along a transverse axis perpendicular to the longitudinal axis, the second gear being received in an inner bore of the first gear, the method comprising:
   inserting at least partially the base portion of the tool within an inner bore of the second gear;
   inserting a first pin extending from the elongate portion within a space between adjacent teeth of the first gear; and
   determining that the second gear is aligned with the first gear if a second pin extending from the elongate portion is received within a space between adjacent teeth of the second gear.

* * * * *